United States Patent
Fiala

(10) Patent No.: US 12,252,915 B2
(45) Date of Patent: Mar. 18, 2025

(54) OVERHEAD STORAGE BIN PIVOT LATCH MECHANISM

(71) Applicant: Safran Cabin Inc., Huntington Beach, CA (US)

(72) Inventor: Peter Fiala, Huntington Beach, CA (US)

(73) Assignee: Safran Cabin Inc., Huntington Beach, CA (US)

( * ) Notice: Subject to any disclaimer, the term of this patent is extended or adjusted under 35 U.S.C. 154(b) by 694 days.

(21) Appl. No.: 17/381,518

(22) Filed: Jul. 21, 2021

(65) Prior Publication Data

US 2023/0026534 A1    Jan. 26, 2023

(51) Int. Cl.
*E05C 3/26* (2006.01)
*B64D 11/00* (2006.01)

(52) U.S. Cl.
CPC .............. *E05C 3/26* (2013.01); *B64D 11/003* (2013.01)

(58) Field of Classification Search
CPC ... E05C 3/26; E05C 3/045; E05C 3/00; E05C 9/1858; E05C 19/04; E05C 19/10; B64D 11/003; Y10T 292/1047; Y10T 292/108; Y10T 292/0824; Y10T 292/0811
USPC .......................................................... 312/327
See application file for complete search history.

(56) References Cited

U.S. PATENT DOCUMENTS

| | | | | |
|---|---|---|---|---|
| 8,770,515 B1 * | 7/2014 | Cloud | .................... | G05G 17/00 |
| | | | | 292/28 |
| 9,499,272 B2 * | 11/2016 | Kearsey | ............... | A47B 46/005 |
| 2013/0076216 A1 * | 3/2013 | Schmitz | ............... | B64D 11/003 |
| | | | | 16/361 |

FOREIGN PATENT DOCUMENTS

| | | | | |
|---|---|---|---|---|
| EP | 3275785 A1 * | 1/2018 | ............ | B60Q 3/225 |
| EP | 3 275 785 B1 | 12/2018 | | |
| WO | WO-2018093382 A1 * | 5/2018 | ........... | A47B 46/005 |

OTHER PUBLICATIONS

Extended European Search Report issued in Application 22185522.4.

* cited by examiner

*Primary Examiner* — Christine M Mills
*Assistant Examiner* — Yahya Sidky
(74) *Attorney, Agent, or Firm* — Kilpatrick Townsend & Stockton LLP

(57) ABSTRACT

An aircraft storage bin that includes a latch system that includes a pivot plate assembly, a mounting plate assembly and a latch button assembly. The pivot plate assembly includes a pivot plate attached to the bucket, a latch arm that is pivotally connected to the pivot plate and is pivotal between latched and unlatched positions, and a latch pawl that is pivotal between latched and unlatched positions. A latch activator is secured to the latch arm, which includes a roller member. The latch pawl includes hook and roller receiver portions. In the latched position, the roller member is received in the roller receiver portion. The mounting plate assembly includes a mounting plate to which the pivot plate is pivotally connected and a striker that is received in the hook portion when the bucket is in the closed position. Movement of the button from the home position to the actuation position moves the latch activator, which pivots the latch arm to the unlatched position, the roller member is released from the roller receiver portion and the latch pawl pivots to the unlatched position and releases the striker from the hook portion.

11 Claims, 8 Drawing Sheets

OVERHEAD STORAGE BIN PIVOT LATCH MECHANISM

FIELD OF THE INVENTION

The present invention relates generally to a latch mechanism, and more particularly to a latch mechanism for use with an aircraft overhead storage pivot bin.

BACKGROUND OF THE INVENTION

A pivot overhead stowage or storage bin is categorized as a bin that opens downward and the shelf that contains the luggage (the bucket) moves lower to become accessible to passengers. Once the luggage is loaded, the bucket is pushed upward to close the bin. See, for example, U.S. Pat. Nos. 9,499,272 and 9,789,963 and 9,731,826, the entireties of which are incorporated by reference herein. The bins in the above-referenced patents bin have a "clamshell" design, which means that the bucket and strongback or upper housing (the fixed upper half of a pivot bin) are aligned. Because the bucket and strongback are aligned, the latches are aligned by incorporating them into the bucket and strongback sidewall panels. Some prior latches have issues with reliability. First, it is possible for foreign material to enter the latch, which can make the latch inoperable. Second, it is possible for soft goods to be caught between the striker and catch of the latch, which can damage the soft goods and/or the latch.

SUMMARY OF THE PREFERRED EMBODIMENTS

In a preferred embodiment, a latch pawl, a down stop pin, a latch activator bolt, an override lever, a pivot point, and a latch lever are incorporated onto a plate to form a sub-assembly (which may be referred to herein as the "bucket latch sub-assembly"). The bucket latch sub-assembly is attached to the bin bucket (e.g., with mounting screws or other threaded fasteners). In a preferred embodiment, a snubber, a striker pin, and a down stop linkage are incorporated onto a plate to form a sub-assembly (which may be referred to herein as the "strongback latch sub-assembly"). The strongback latch sub-assembly is attached to the bin strongback or upper housing (e.g., with mounting screws or other threaded fasteners).

In a preferred embodiment, a latch button is located on the bin bucket. The latch button is connected to a torque tube, a crank, and a link which comprises a "latch button sub-assembly". The latch button sub-assembly is connected to the bucket latch subassembly by the link. It will be appreciate that the latch button sub-assembly can include other components. The use of a torque tube, crank and link is not limiting. In another embodiment, the latch system can be activated by a paddle latch and cable. In the embodiment shown in the drawings, when the button is pressed, the torque tube rotates, which rotates the crank, which pulls the link, which pulls the latch activator bolt, which rotates the latch lever out of the latch pawl catch, which causes the latch pawl to rotate around the striker pin. When the latch pawl is no longer in contact with the striker pin, the bin opens. During opening, the snubber compresses, which controls the movement of the bucket. Also, the down stop pin travels within the down stop linkage. When the down stop pin reaches the bottom of the linkage, the bucket stops and the opening is complete.

To close the bin, a passenger pushes on the bucket. The latch pawl makes contact with the striker and rotates around the striker until the latch pawl catches the latch lever, at which point the latch pawl can no longer rotate. This locks the latch pawl in place on the latch striker. When the override lever is pressed, the latch activator bolt is pushed which causes the latch activator arm to rotate out of the latch pawl catch. This causes the latch pawl to rotate around the striker pin and open the bin. In a preferred embodiment, cover plates cover the bucket latch sub-assembly and strongback latch sub-assembly.

It will be appreciated that the present invention improves an overhead stowage pivot bin by taking components that are typically separate items (the latches, pivot, down stop, and snubber) and incorporating them into a sub-assembly. This sub-assembly reduces the potential misalignment of the bin latch catch and striker thus increasing reliability. In addition this invention may reduce the part count and may reduce manufacturing labor.

The present invention moves the latch catch and latch striker closer to the pivot (compared to the prior art), and the latch catch and latch striker are covered by cover plates. This reduces the potential misalignment of the latch catch and latch striker and removes the possibility that foreign material and/or soft goods can come in contact with the latch catch and/or latch striker.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
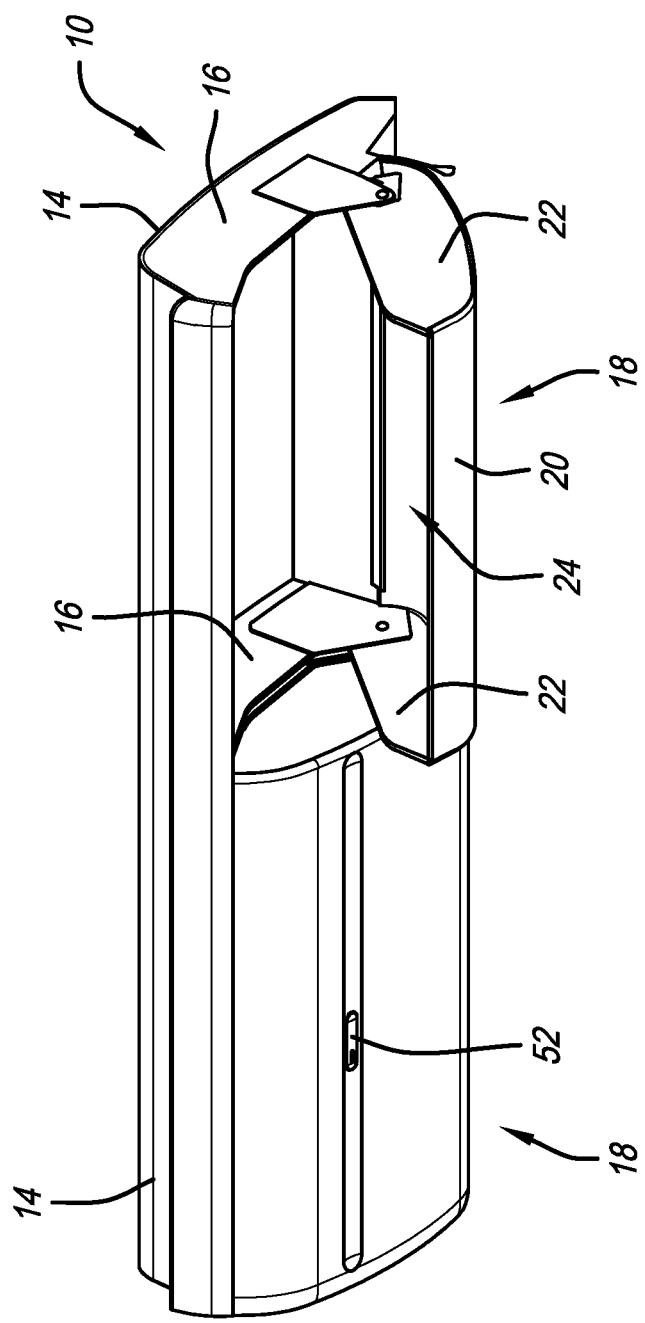
FIG. 1 is a perspective view of an aircraft storage bin in accordance with a preferred embodiment of the present invention.
Figure 2:
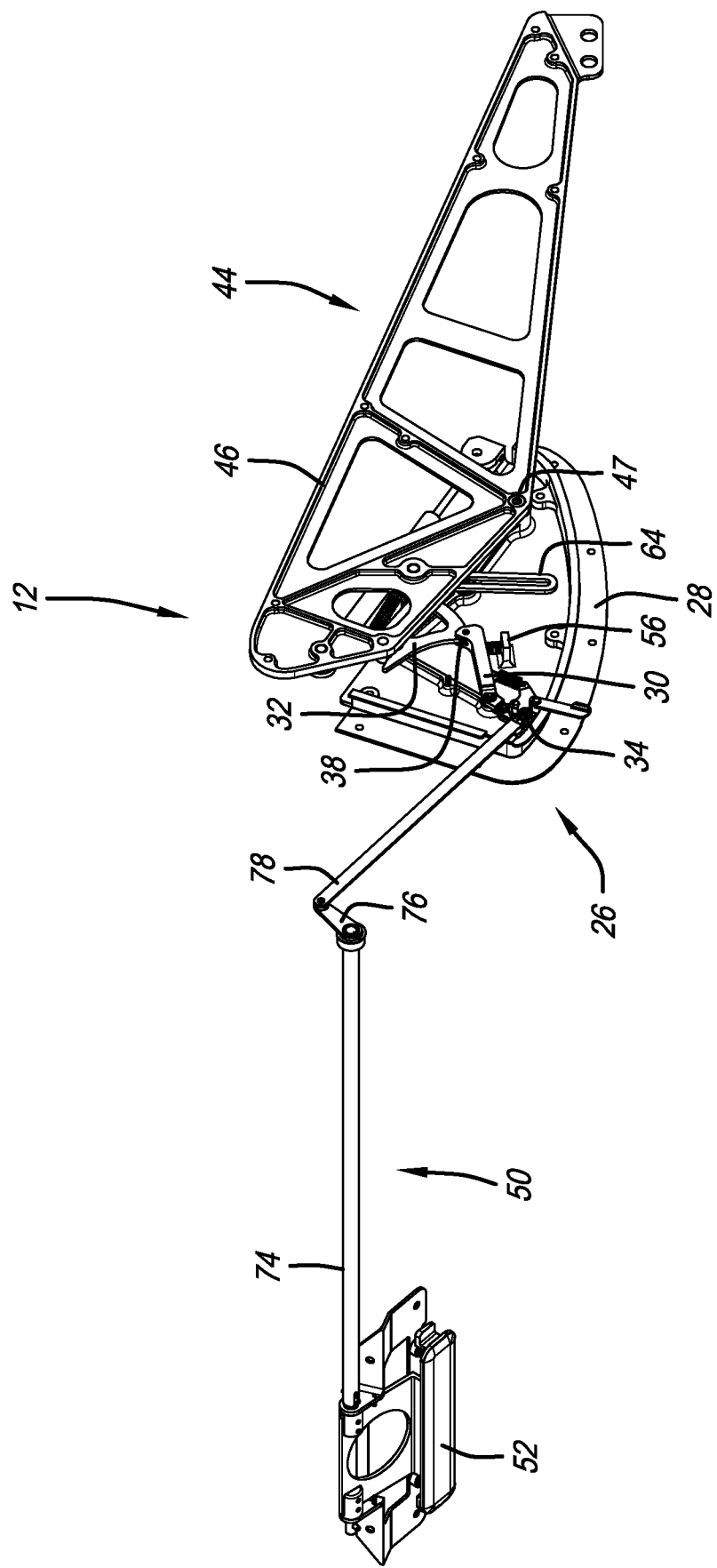
FIG. 2 is a perspective view of a latch system usable with the aircraft storage bin of FIG. 1 in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. Furthermore, any particular feature, structure, or characteristic described herein may be optional.

Referring now to the drawings, which are for purposes of illustrating the present invention and not for purposes of limiting the same, FIGS. 1-8 show an aircraft storage bin 10 that includes one or more latch assemblies or systems 12 for opening and closing the bin. In a preferred embodiment, the storage bin 10 includes an upper housing 14 that includes first and second side panels 16, a bucket 18 that includes a bottom 20 and first and second side walls 22 and that cooperates with the upper housing 14 to define a bin interior 24, and the latch system 12. The bucket 18 is movable with respect to the upper housing 14 between an open position and a closed position.

Figure 5:
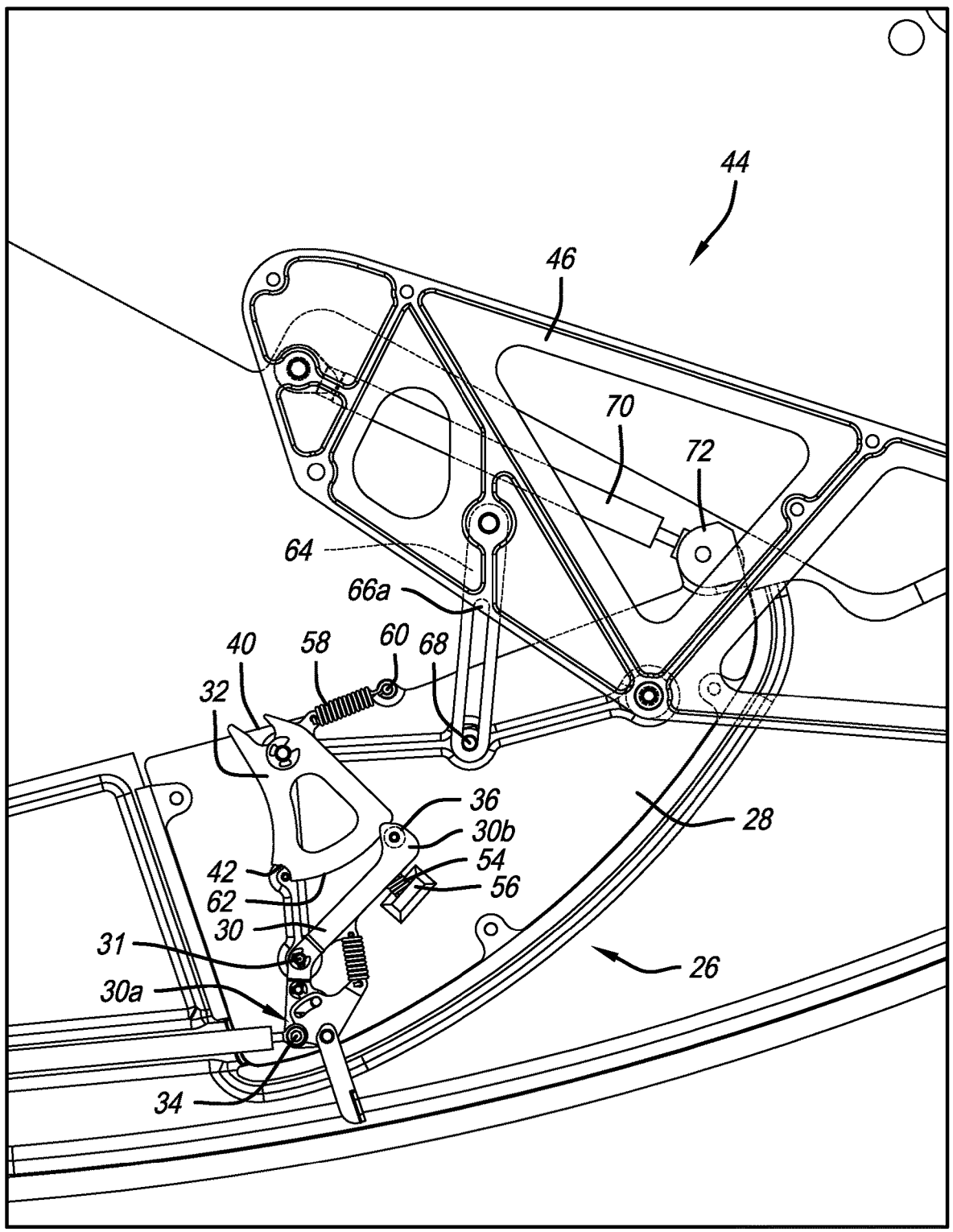
FIG. 5 is a side elevational view of the aircraft storage bin in the open position and the latch system in the unlatched position.

In a preferred embodiment, the latch system includes a pivot plate assembly 26 that includes a pivot plate 28 that is attached to the bucket 18 and preferably one of the side walls 22 of the bucket, a latch arm 30, with first and second ends 30a and 30b, that is pivotally connected to the pivot plate 28 (at pivot point 31) between the first and second ends 30a and 30b and is pivotal between a latched position (FIG. 3) and an unlatched position (FIG. 5). The pivot plate assembly 26 also includes a latch pawl 32 that is pivotal between a latched position and an unlatched position. A latch activator 34 is secured at the first end 30a of the latch arm 30. The second end 30b of the latch arm 30 includes a roller member 36 that is secured in a roller space 38 defined in the second end 30b of the latch arm 30. The latch pawl 32 includes a hook portion 40 defined therein and a roller indentation or roller receiver portion 42 defined therein. In the latched position, the roller member 36 is received in the roller receiver portion 42.

The latch system 12 also includes a mounting plate assembly 44 that includes a mounting plate 46 that is attached to the upper housing 14, and preferably one of the side panels 16. The pivot plate 28 is pivotally connected to the mounting plate 46 (at pivot point 47) and includes a striker 48 that is received in the hook portion 40 when the bucket 18 is in the closed position.

The latch system 12 also includes a latch button assembly 50 that is operationally connected to the second end of the latch arm 30 and preferably, the latch activator 34. The latch button assembly 50 includes a button 52 that is movable between a home position and an actuation position. Movement of the button 52 from the home position to the actuation position moves the latch activator 34, thereby pivoting the latch arm 30 from the latched position to the unlatched position. When the latch arm 30 pivots (downwardly in FIGS. 4 and 5, the roller member 36 is released from the roller receiver portion 42 and the latch pawl 32 pivots from the latched position to the unlatched position and releases the striker 48 from the hook portion 40. As a result, the bucket moves from the closed position to the open position. It will be appreciated that the term button is not limiting and the button can move linearly (e.g., pushed inwardly) or pivotablly (e.g., pushed or pulled pivotally) to unlatch the bucket.

Figure 3:
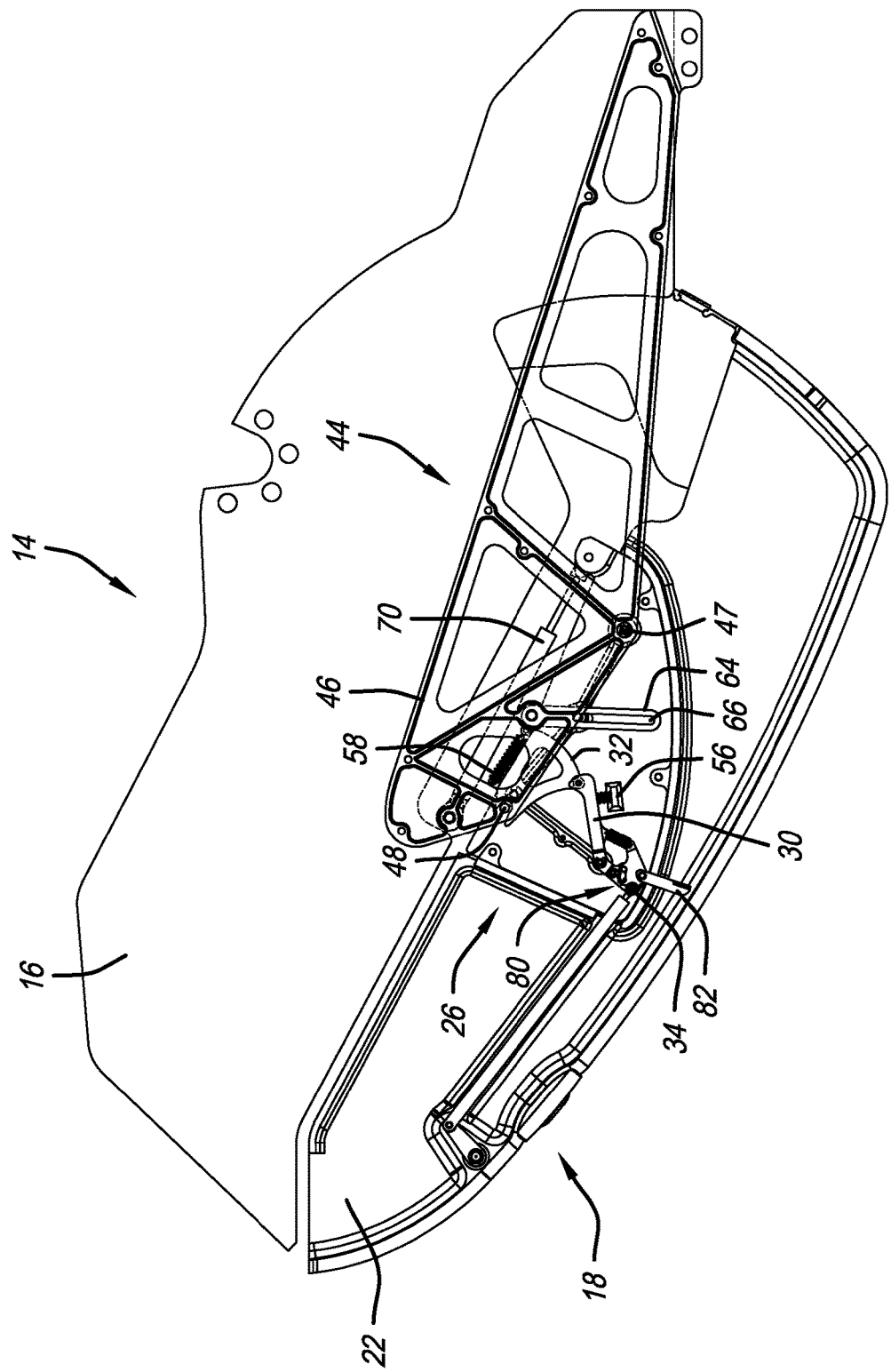
FIG. 3 is a side elevational view of the aircraft storage bin in the closed position and the latch system in the latched position.
Figure 4:
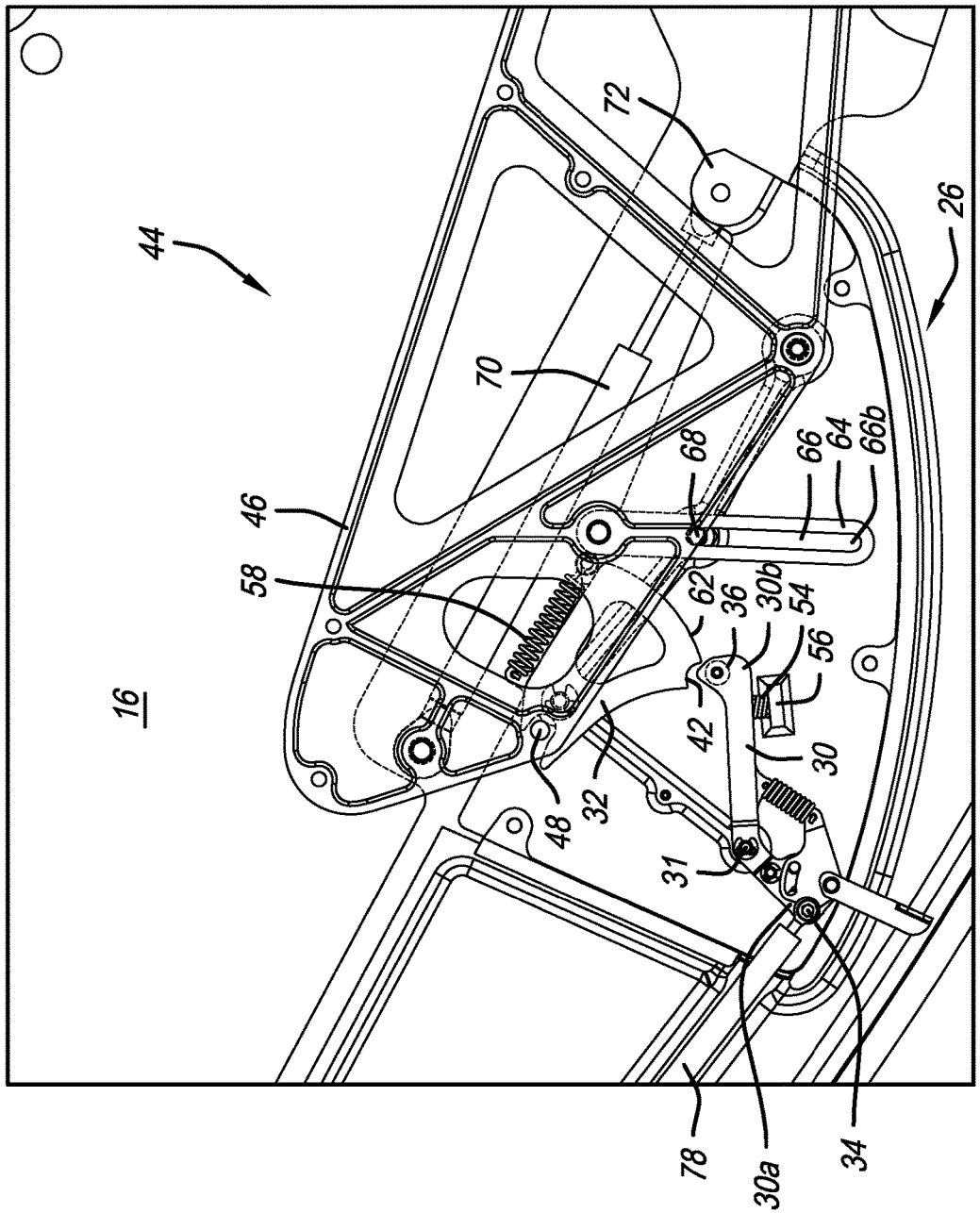
FIG. 4 is a side elevational view of the aircraft storage bin as it is opening and the latch system as it is unlatching.

In a preferred embodiment, the latch pawl 32 is biased to the unlatched position and the latch arm 30 is biased toward the latched position. As shown in FIGS. 3-5, latch arm spring 54 is compressed between latch arm 30 and shelf 56 that extends outwardly from the pivot plate 28. Any connection between the latch arm 30 and shelf 56 for latch arm spring 54 is within the scope of the invention. In a preferred embodiment, latch arm spring 54 bears against shelf 56 and the opposite end is connected to latch arm 30 (e.g., an end of the spring is received in an opening in the latch arm). Latch arm spring 54 biases latch arm 30 to the latched position. Latch pawl spring 58 extends between the latch pawl 32 and spring post 60. Preferably, latch pawl spring 58 is in tension and biases or pulls the latch pawl 32 to the unlatched position. However, latch pawl spring 58 may also be configured such that it is in compression.

As shown in FIGS. 3-5, in a preferred embodiment, the latch pawl 32 includes a roller surface 62 on an end of the latch pawl 32 opposite the hook portion 40. FIG. 4 shows the latch arm 30 as it is unlatching and moved downwardly such that the roller member 36 has been released from or moved out of the roller receiver portion 42. When this happens, because the latch pawl is biased to the unlatched position, the latch pawl begins to rotate or pivot about the pivot point. Because latch arm 30 is biased to the latched position, the roller member 36 is pushed by latch arm spring 54 against roller surface 62. Therefore, as the latch pawl 32 pivots from the latched position to the unlatched position, the roller member 36 moves along the roller surface 62.

As shown in FIGS. 3-5, in a preferred embodiment, the mounting plate assembly 44 includes a down stop linkage 64 that is pivotally connected to and extends downwardly from the mounting plate 46. The down stop linkage 64 includes a slot 66 that includes upper and lower ends 66a and 66b defined therein. A down stop member 68 extends from the pivot plate 28 and is received in the slot 66. The down stop linkage 64 and down stop member 68 (which may be referred to herein as a down stop assembly) control the end movements of the bucket as it moves up and down. In other words, when the down stop member 68 reaches the lower end of the slot, the bucket is stopped in the open position. When the bucket moves from the closed position to the open position the down stop member 68 travels from the upper end 66a of the slot 66 to the lower end 66b of the slot 66 to maintain the bucket 18 in the open position. It will be appreciated that due to the motion of the bucket as it opens that the down stop arm or linkage 64 pivots. Therefore, the down stop linkage 64 is pivotally connected to the mounting plate 46.

In a preferred embodiment, the mounting plate assembly 44 includes a snubber 70 that extends between the mounting plate 46 and the pivot plate 28 (see bracket member 72 extending from the pivot plate 28). The snubber 70 dampens or slows the descent of the bucket 18 as it moves from the closed position to the open position.

It will be appreciated that when the button 52 is pressed, the latch button assembly 50 moves or pulls the latch activator 34 to begin the unlatching process. Any operational connection between the button and the latch activator is within the scope of the invention. In a preferred embodiment, the latch button assembly includes a torque tube 74, crank 76 and telegraph link 78 operationally positioned between the button 52 and the latch activator 34. In use, when the button us pushed, the torque tube 74 rotates, which pivots the crank 76 forwardly (left in FIGS. 3-5), which pulls the telegraph link 78, which pulls the latch activator 34. In a preferred embodiment, the latch button assembly includes a single button with torque tubes extending outwardly toward both sides of the bin and all other parts discussed herein are duplicated for both sides of the bin. In another embodiment only one side of the bin includes a latch system. In a preferred embodiment, the button 52 remains in the actuation position (e.g., pushed in) when the latch arm or lever is in the unlatch position. When the latch arm 30 and latch pawl 32 move back to the latched position (as a result of the striker 48 contacting the surface of the hook portion 40 referred to herein as the closing surface 86 when the bucket is closed), the latch activator 34 moves forwardly (left in FIGS. 3-5), which pushes the telegraph link 78, which pivots the crank 76 rearwardly and rotates torque tube 74 and moves the button back to the home position (outwardly). In a preferred embodiment, the inner surface of the housing surrounding the button 52 includes a color indicator (e.g., red) around its periphery so that it indicates when the button is in the actuation position and the latch pawl and other components are in the unlatched position.

Figure 6:
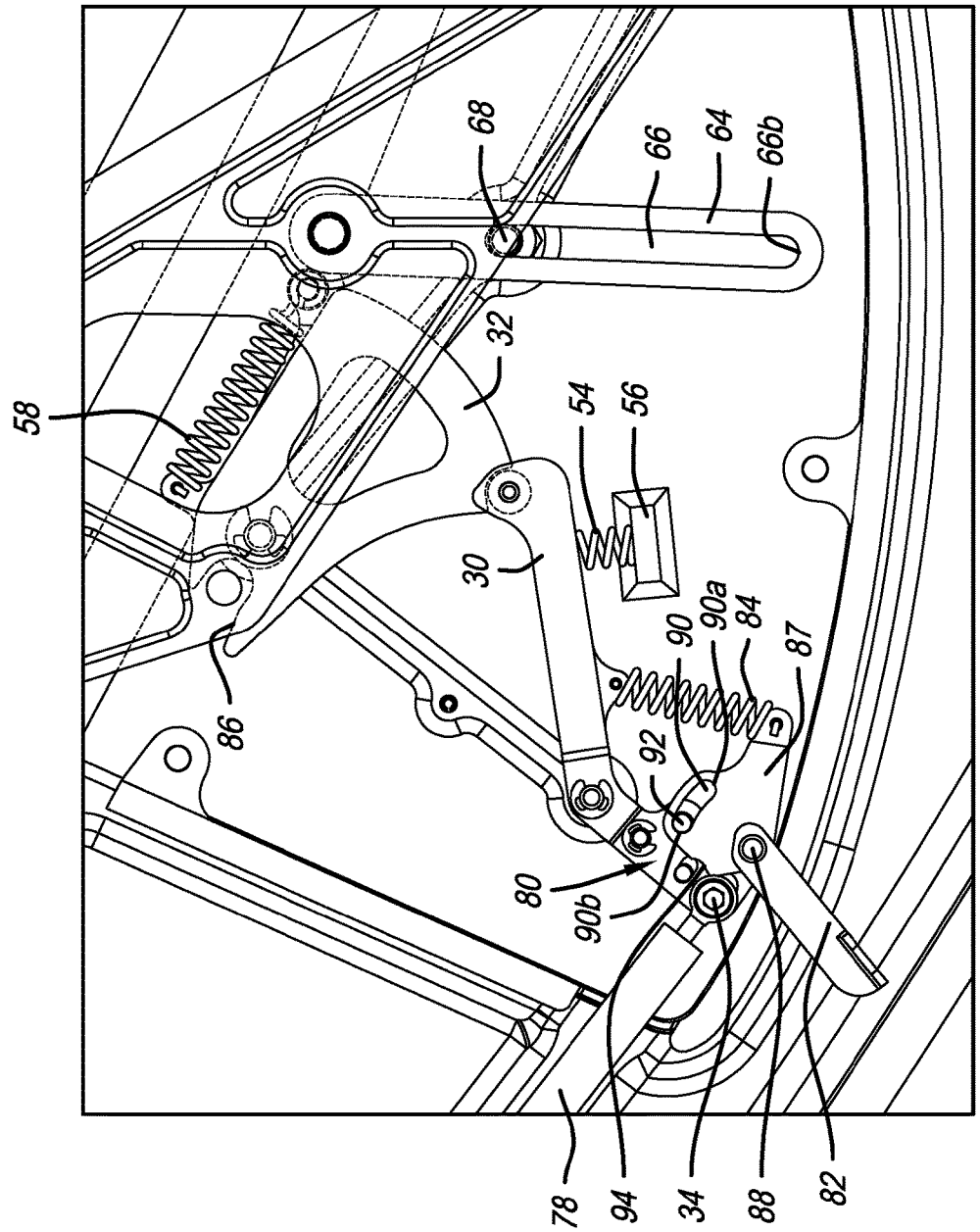
FIG. 6 is a side elevational view of the override lever in the disconnection position.
Figure 7:
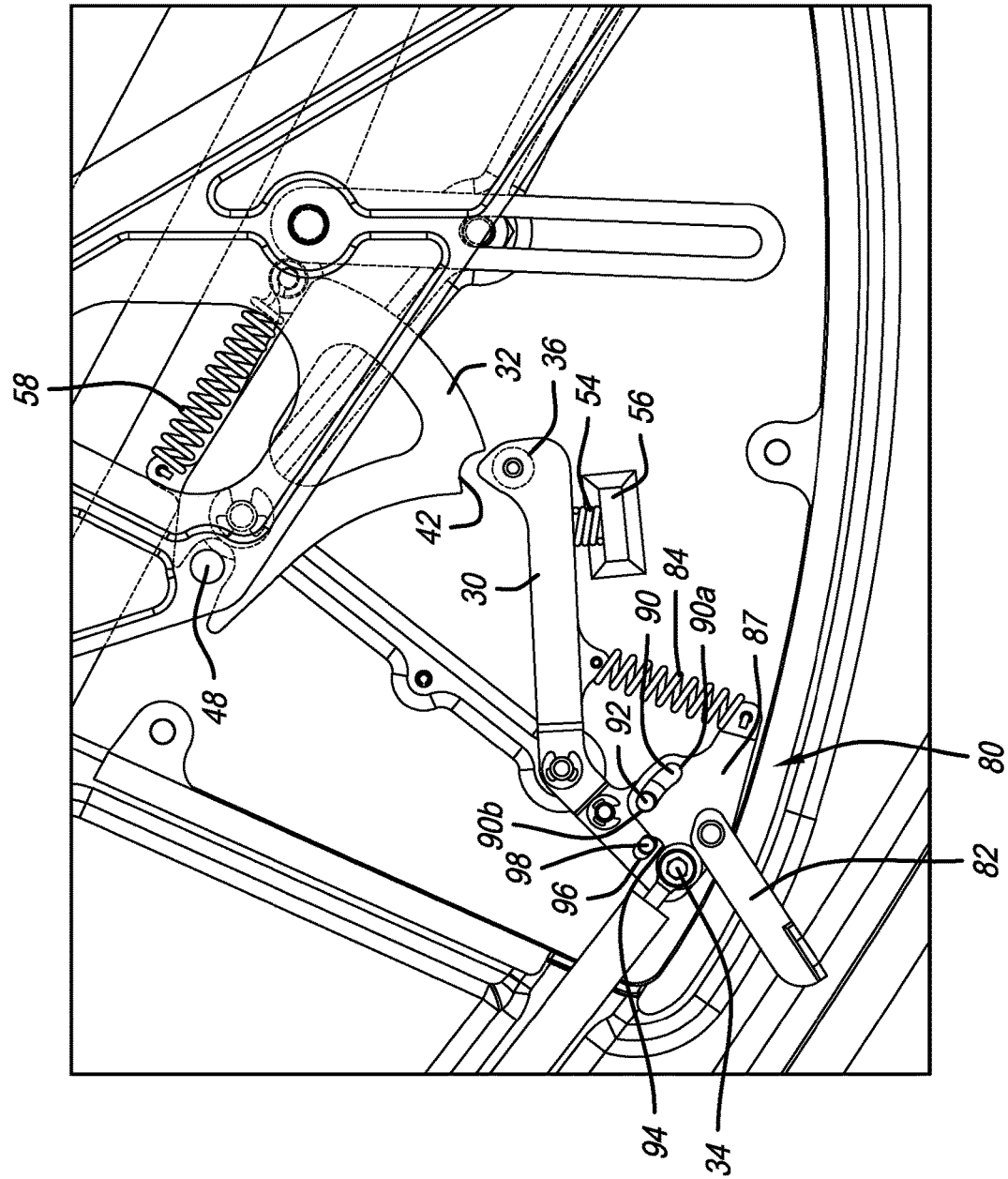
FIG. 7 is a side elevational view of the override lever as it moves the latch arm to the unlatching position.
Figure 8:
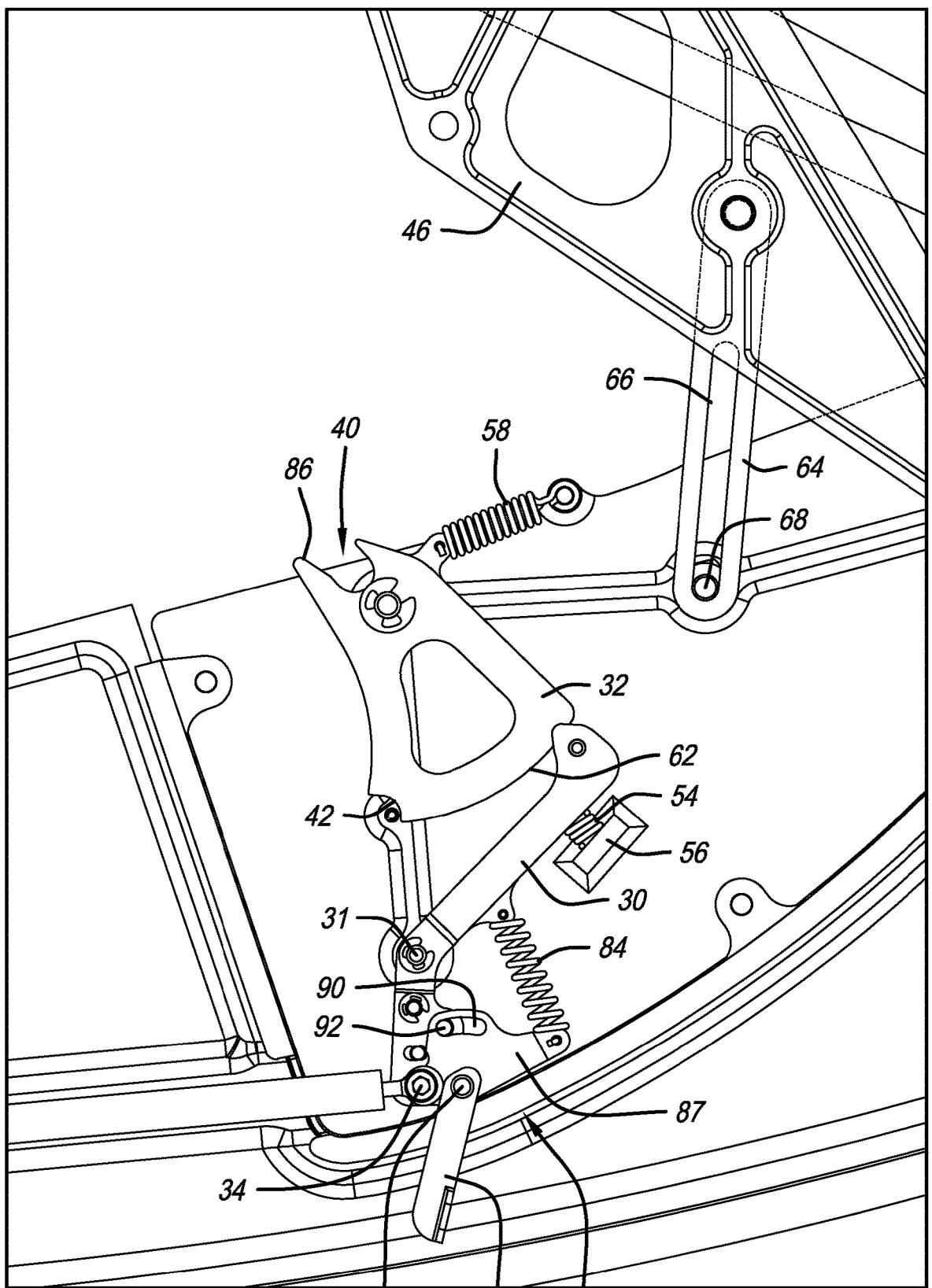
FIG. 8 is a side elevational view of the override lever and latch pawl in the unlatched position.

As shown in FIGS. 6-8, in a preferred embodiment, the latch system includes an override lever assembly 80 that includes an override lever 82, an override spring 84 and an override plate 87. The override spring 84 or other biasing member extends between the override plate 87 and the latch arm 30 to bias the override lever 82 to the home position, as discussed further below. In a preferred embodiment, the override lever assembly 80 is operatively connected and preferably pivotally connected to the latch arm 30. Generally, movement of the override lever 82 from the home position to the unlatched position pivots the latch arm 30 to the unlatched position.

In a preferred embodiment, The override plate 87 is pivotally connected to the latch arm 30 (near the second end) at pivot point 88. The override plate 87 includes an override slot 90 defined therein and a stop member 92 extends from the latch arm 30 and is received in the override slot 90. The override lever 82 is pivotal between the home position (FIG. 3) and a disconnection position (FIG. 6) where the override lever 82 pivots with respect to the latch arm 30. When this movement happens, the slot 90 moves with the override plate 87 and the stop member "travels" along the slot. It will be appreciated that the stop member 92 does not actually move, but the slot moves. In the home position (of the override lever), the stop member 92 is located at a first end 90a of slot 90. In the disconnection position, the stop member 92 is located at the second end 90b of slot 90 (compare FIGS. 3 and 6). The override lever 82 is also pivotal together with the latch arm 30 between the disconnection position and an unlatched position, thus pivoting the latch arm 30 to the unlatched position (FIG. 7). This movement happens because the second end 90b of the slot pushes against the stop member 92, which is part of the latch arm 30. When this happens, similar to the movement described above when the latch lever moves to the unlatched position, the roller member 36 is released from or moved out of the roller receiver portion 42, and, because the latch pawl is biased to the unlatched position, the latch pawl begins to rotate or pivot about the pivot point. Because latch arm 30 is biased to the latched position, the roller member 36 is pushed by latch arm spring 54 against roller surface 62. Therefore, as the latch pawl 32 pivots from the latched position to the unlatched position, the roller member 36 moves along the roller surface 62 and the latch pawl is unlatched.

In a preferred embodiment, the override plate 87 includes an indentation 94 therein that receives a portion of the latch activator 34 therein. The latch activator 34 exits the indentation 94 when the override lever is moved to the disconnection position, as shown in FIG. 6. This disconnects the latch activator from the latch lever, thus allowing the override lever to unlatch the assembly, as opposed to movement of the latch activator.

FIGS. 6-7 also show a slot 96 and stop member 98 that provide the ends of movement of the latch arm 30 when it moves.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples and are not limiting: alternative implementations may employ differing values, measurements or ranges.

Any patents and applications and other references noted above, including any that may be listed in accompanying filing papers, are incorporated herein by reference in their entirety.

What is claimed is:

1. An aircraft storage bin that comprises:
   an upper housing that includes first and second side panels,
   a bucket that cooperates with the upper housing to define a bin interior, wherein the bucket is movable with respect to the upper housing between an open position and a closed position, wherein the bucket includes a bottom and first and second side walls, and
   a latch system that includes
      a pivot plate assembly that includes a pivot plate that is attached to the bucket, a latch arm with first and second ends that is pivotally connected to the pivot plate between the first and second ends and is pivotal between a latched position and an unlatched position, and a latch pawl that is pivotal between a latched position and an unlatched position, wherein a latch activator is secured at the first end of the latch arm and wherein the second end of the latch arm includes a roller member, wherein the latch pawl includes a hook portion and a roller receiver portion, wherein in the latched position, the roller member is received in the roller receiver portion,
      a mounting plate assembly that includes a mounting plate that is attached to the upper housing, wherein the pivot plate is pivotally connected to the mounting plate and includes a striker that is received in the hook portion when the bucket is in the closed position, wherein the mounting plate assembly includes a down stop linkage that is pivotally connected to and extends downwardly from the mounting plate, wherein the down stop linkage includes a slot that includes upper and lower ends defined therein, wherein a down stop member that extends from the pivot plate is received in the slot, and
      a latch button assembly that is operationally connected to the latch activator and that includes a button that is movable between a home position and an actuation position, wherein movement of the button from the home position to the actuation position moves the latch activator, thereby pivoting the latch arm from the latched position to the unlatched position such that the roller member is released from the roller receiver portion and the latch pawl pivots from the latched position to the unlatched position and releases the striker from the hook portion, whereby the bucket moves from the closed position to the open position, wherein when the bucket moves from the closed position to the open position the down stop member travels from the upper end of the slot to the lower end of the slot to maintain the bucket in the open position.

2. The aircraft storage bin of claim 1 wherein the latch pawl includes a roller surface, wherein when the latch pawl pivots from the latched position to the unlatched position, the roller member moves along the roller surface.

3. The aircraft storage bin of claim 1, wherein the latch pawl is biased to the unlatched position and the latch arm is biased to the latched position.

4. The aircraft storage bin of claim 3 wherein the mounting plate assembly includes a snubber that extends between the mounting plate and the pivot plate, wherein the snubber provides dampening as the bucket moves from the closed position to the open position.

5. The aircraft storage bin of claim 3 wherein the pivot plate includes a shelf, and wherein a latch arm spring extends between the shelf and the latch arm to bias the latch arm to the latched position.

6. The aircraft storage bin of claim 1 further comprising an override lever assembly operatively connected to the latch arm, wherein the override lever assembly includes an override lever and an override plate, and wherein movement of the override lever pivots the latch arm to the unlatched position.

7. The aircraft storage bin of claim 6 wherein the override plate is pivotally connected to the latch arm, wherein the override plate includes an override slot defined therein, wherein a stop member extends from the latch lever and is received in the override slot, wherein the override lever is pivotal between a home position and a disconnection position where the override lever pivots with respect to the latch lever, wherein the override lever is pivotal between the disconnection position and an unlatched position, where the latch lever pivots to the Page 3 of unlatched position, wherein the stop member is located at a first end of the slot when the override lever is in the home position and a second end of the slot when the override lever is in the disconnection position and the unlatched position.

8. The aircraft storage bin of claim 7 wherein the override plate includes an indentation therein that receives a portion of the latch activator therein, wherein the latch activator exits the indentation when the override lever is moved to the disconnection position.

9. The aircraft storage bin of claim 7 further comprising an override spring extending between the override plate and the latch arm to bias the override lever to the home position.

10. A latch system configured to be used with a storage bin that includes an upper housing and a bucket that is movable with respect to the upper housing between an open position and a closed position, wherein the latch system comprises:

a pivot plate assembly that includes a pivot plate that is configured to be attached to the bucket, a latch arm with first and second ends that is pivotally connected to the pivot plate between the first and second ends and is pivotal between a latched position and an unlatched position, and a latch pawl that is pivotal between a latched position and an unlatched position, wherein a latch activator is secured at the first end of the latch arm and wherein the second end of the latch arm includes a roller member, wherein the latch pawl includes a hook portion and a roller receiver portion, wherein in the latched position, the roller member is received in the roller receiver portion, a mounting plate assembly that includes a mounting plate that is configured to be attached to the upper housing, wherein the pivot plate is pivotally connected to the mounting plate and includes a striker that is received in the hook portion when the bucket is in the closed position, wherein the mounting plate assembly includes a down stop linkage that is pivotally connected to and extends downwardly from the mounting plate, wherein the down stop linkage includes a slot that includes upper and lower ends defined therein, wherein a down stop member that extends from the pivot plate is received in the slot, and a latch button assembly that is operationally connected to the latch activator and that includes a button that is movable between a home position and an actuation position, wherein movement of the button from the home position to the actuation position moves the latch activator, thereby pivoting the latch arm from the latched position to the unlatched position such that the roller member is released from the roller receiver portion and the latch pawl pivots from the latched position to the unlatched position and releases the striker from the hook portion, whereby the bucket moves from the closed position to the open position, wherein when the bucket moves from the closed position to the open position the down stop member travels from the upper end of the slot to the lower end of the slot to maintain the bucket in the open position.

11. The latch system of claim 10 further comprising an override lever assembly operatively connected to the latch arm, wherein the override lever assembly includes an override lever and an override plate, and wherein movement of the override lever pivots the latch arm to the unlatched position.

* * * * *